UNITED STATES PATENT OFFICE.

EBERHARD KOCH, OF NEW ORLEANS, LOUISIANA, ASSIGNOR OF ONE-HALF TO CHARLES J. ALLEN, OF SAME PLACE.

PROCESS OF DISTILLING PINE-WOOD FOR THE PRODUCTION OF CRUDE DRY TURPENTINE AND PINE-TAR.

SPECIFICATION forming part of Letters Patent No. 386,138, dated July 17, 1888.

Application filed March 1, 1887. Serial No. 229,329. (No specimens.)

*To all whom it may concern:*

Be it known that I, EBERHARD KOCH, of New Orleans, in the parish of Orleans and State of Louisiana, have invented certain new and useful Improvements in Distillation of Pine-Wood for the Production of Crude Dry Turpentine and Pine-Tar; and I do hereby declare the following to be a full, clear, and exact description of the invention, such as will enable others skilled in the art to which it appertains to make and use the same.

My invention relates to an improvement in the distillation of pine-wood for the production of crude dry turpentine and pine-tar.

I first obtain the pine-wood and by dry distillation obtain the pine-wood oil, which is collected in large open vats. The process of separating the pyroligneous acid with which the oil is impregnated is accomplished by introducing a thin solution of milk of lime into the same and the whole kept thoroughly agitated until the lime is thoroughly incorporated thereinto and all the acid neutralized, when it is left standing about twenty-four hours, when the lye (which has in the meantime become separated from the oil) is drawn off and put away for further use. The oil which now remains in the vat is mixed with a weak solution of sulphuric acid and the whole agitated in order to expel the last remaining traces of the alkali. The acid solution is then drawn off. The oil is now ready to go into the still, after which a gentle fire is started, and gradually increased until all the light oil has been eliminated and the residue has the consistency of pine-tar, which latter is now a commercial article.

In the distillation and rectification of turpentine, and in the production of oil of tar, the crude dry distilled turpentine obtained as above described is mixed with an aqueous solution containing about fifteen per cent. of caustic soda of the strength of, say, 20° Baumé. The turpentine is left to itself for some time, after which the lye which accumulates beneath the turpentine is drawn off and the turpentine put into a clean copper still and subjected to distillation, from which about sixty per cent. of very fine turpentine is obtained, while the residue—about forty per cent.—consists of a superior article known to commerce as "oil of tar."

In order to eliminate the last remaining traces of creosote in the now fine turpentine, a further distillation and rectification is necessary, and to effect this the turpentine is mixed with an aqueous solution, about eight per cent., of caustic potash of about 8° Baumé and thoroughly mixed. The lye is then drawn off and the oil is mixed with about a twentieth part of concentrated sulphuric acid, after which it is agitated and drawn off. It is then washed with water, and again with an aqueous solution containing about two per cent. of caustic potash of about 2° Baumé neutralized. The last alkaline solution is now drawn off, and the oil is then put into a copper still and distilled, and the product thus obtained is a new article of commerce equal in all respects to spirits of turpentine in body as well as in specific gravity.

It is evident that slight changes might be resorted to in the quantities and strength of the different articles used in this process without departing from the spirit and scope of my invention; hence I do not wish to limit myself to the exact quantities and strength of the articles used; but they may be modified according to the condition of the materials to be worked upon.

Having fully described my invention, what I claim as new, and desire to secure by Letters Patent, is—

1. The process for the production of turpentine and pine-tar, consisting, essentially, in extracting the pine-oil by dry distillation, agitating the distillate with milk of lime, allowing the mixture to settle, separating the oil and lye or other impurities which have combined therewith, agitating the oil with dilute sulphuric acid, removing the last remaining traces of alkali, and finally distilling the oil.

2. The process for the production of turpentine and pine-tar, consisting, essentially, in extracting the pine-oil by dry distillation, mixing a solution of caustic soda with the crude dry distilled turpentine, allowing it to settle, drawing off the accumulated lye, redistilling the turpentine, then thoroughly intermixing an aqueous solution of caustic potash, separating the oil and lye, agitating the oil with concentrated sulphuric acid, washing it out with water and again with an aqueous solution of caustic potash, and finally redistilling the oil.

In testimony whereof I have signed this specification in the presence of two subscribing witnesses.

EBERHARD KOCH.

Witnesses:
JAMES F. HENRY,
C. SCHÜLER.